May 10, 1932.  J. SCHADE  1,857,287
OPENING AND LOCKING MEANS FOR LOOSE LEAF RING STRUCTURES
Filed May 5, 1931  2 Sheets-Sheet 1
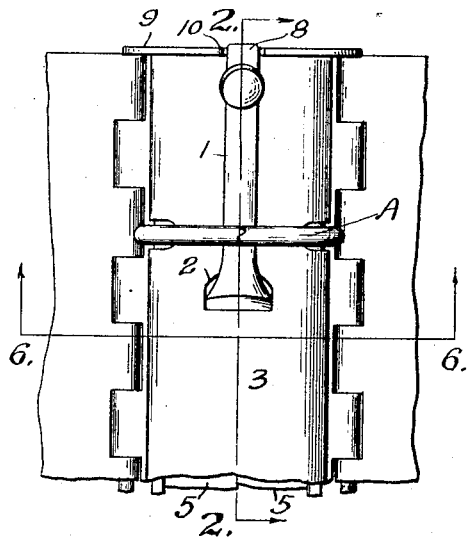
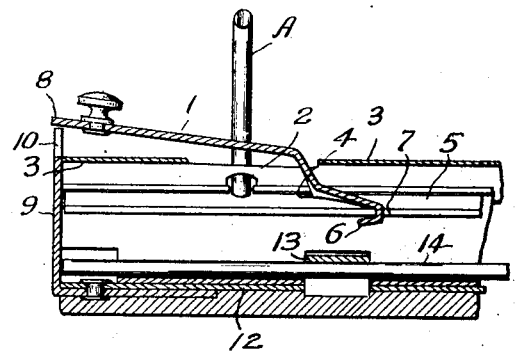
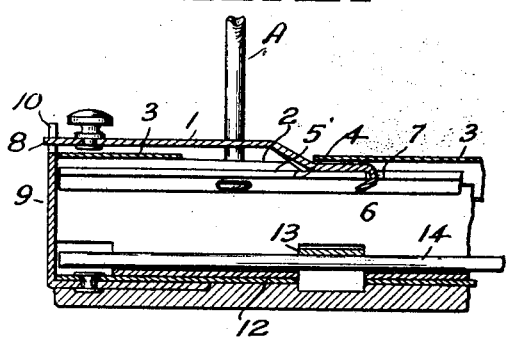
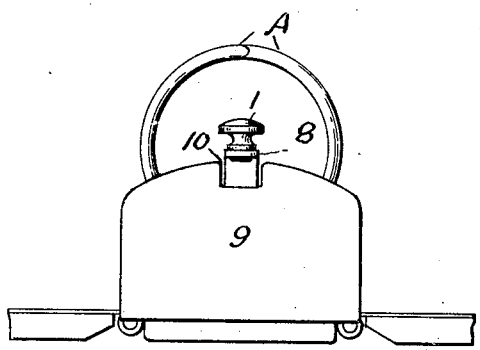
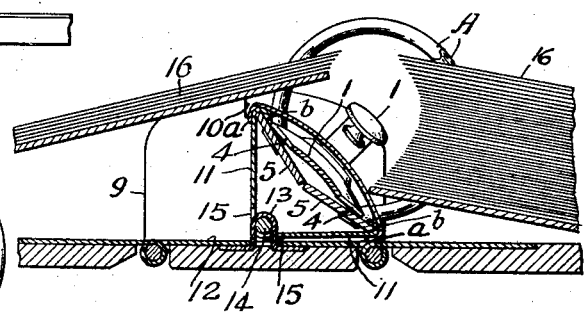
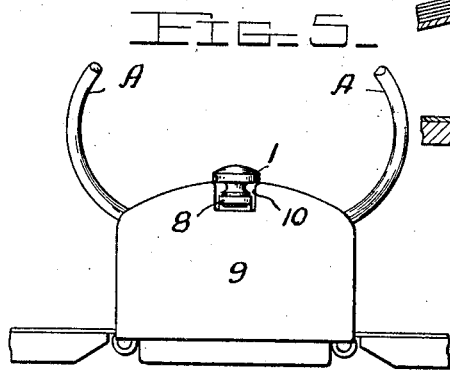
Inventor
John Schade
by
Attorney May 10, 1932. J. SCHADE 1,857,287
OPENING AND LOCKING MEANS FOR LOOSE LEAF RING STRUCTURES
Filed May 5, 1931 2 Sheets-Sheet 2
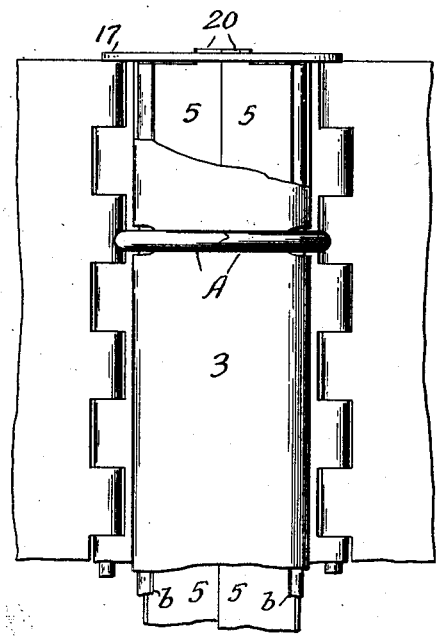
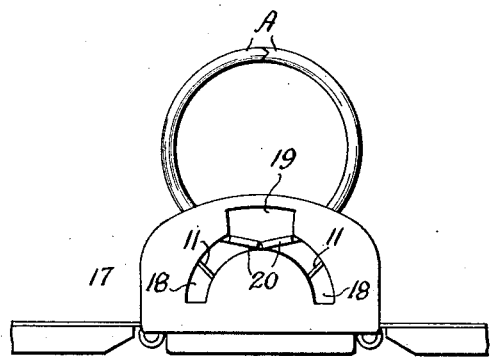
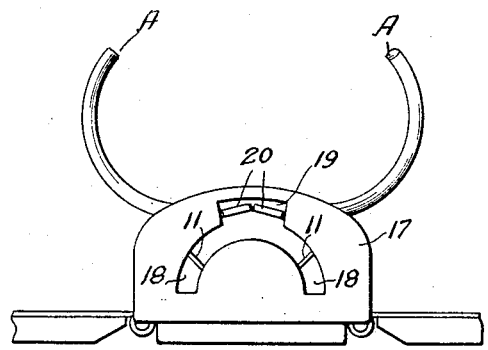
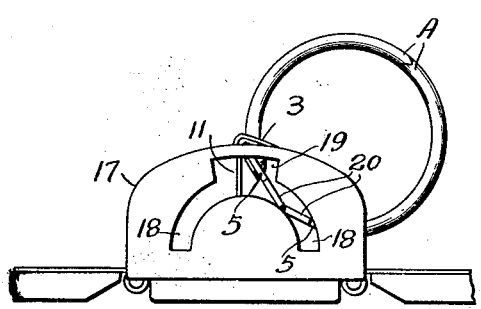
Inventor
John Schade
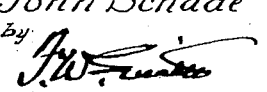
Attorney Patented May 10, 1932

1,857,287

UNITED STATES PATENT OFFICE

JOHN SCHADE, OF HOLYOKE, MASSACHUSETTS, ASSIGNOR TO NATIONAL BLANK BOOK COMPANY, OF HOLYOKE, MASSACHUSETTS, A CORPORATION OF MASSACHUSETTS

OPENING AND LOCKING MEANS FOR LOOSE LEAF RING STRUCTURES

Application filed May 5, 1931. Serial No. 535,125.

My invention relates to loose leaf ring binders of the type shown and described in my pending application, Serial No. 509,336, filed January 17, 1931.

The structure shown in said application is pivoted at the bottom to a back plate and is capable of a rocking movement from side to side, but when the loose leaves are mostly on one side of the rings, the joints of the rings are so close to the leaves, that when the rings are opened to remove or insert sheets, the loose leaves are very apt to become accidentally detached from the rings, and it is the object of the present invention to prevent the opening of the rings either by a booster or by pulling them apart unless the rockable structure is in a vertical position with the joints of the rings at the top of said structure, so that said joints will be remote from the sheets.

In the accompanying drawings,

Figure 1 is a broken top view of the binder with rings closed and equipped with a booster in position for opening the rings and locking the structure—

Figure 2 is a section at the line 2—2 of Figure 1—

Figure 3 is an end view of the construction shown at Figure 1—

Figure 4 is a section similar to Figure 2 but with the rings opened and structure locked—

Figure 5 is a view like Figure 3 but with the rings opened and structure locked—

Figure 6 is a cross section of the binder in tilted position, with loose leaves on the rings and the latter closed—

Figure 7 is a broken top view of the binder with the rings closed and equipped for operation without a booster—

Figure 8 is an end view of the construction shown at Figure 7—

Figure 9 is a view similar to Figure 8 but with the rings opened, and

Figure 10 is a view similar to Figure 8 with the rockable structure tilted to one side.

Similar numerals of reference denote like parts in the several figures of the drawings.

Referring to Figures 1 to 6 inclusive, the binder is shown equipped with a booster for opening the rings A, this booster being denoted by the numeral 1 with its inner end extending through an opening 2 in the cover plate 3 of the binder, the sides 4 of this, end beneath said plate being fulcrumed against the outer edges of the ring or prong carrying leaves 5 that are resiliently confined in the usual manner by inturned flanges a at the sides of said plate, while the tip 6 of said end extends through openings 7 in the inner edges of said leaves and is clinched beneath the latter.

This booster as above described is precisely the same as that shown and described in my pending application, Serial No. 535,126, filed on even date herewith, so far as its fulcrums and lifting connection with the leaves are concerned, but it extends above the plate 3 and its rear end 8 is close to the end plate 9 of the binder, so that it is impossible to pull the rings apart when the structure is tilted to one side.

The end plate 9 has within its upper middle portion a gate 10, and when the binder has been swung to a vertical position the end 8 of the booster is immediately above said gate, so that, when the booster is depressed it will open the rings or prongs and this end 8 will be housed within said gate, thus locking the binder structure in vertical position, so that there will be no likelihood of the leaves accidentally coming off the prongs.

No detail description has been given of the rockable structure or of the fulcruming of the booster and its lifting attachment to the prong carrying leaves, since such description is deemed unnecessary in view of the pending applications above referred to, and, referring to Figure 6, it is merely necessary to call attention to the fact that the rockable structure comprises the cover plate 3, integral side portions 11 that meet at an angle at their lower ends where they are pivoted at the back 12 of the binder to a series of straps 13 by means of a rod 14, said straps extending in loop form through openings 15 in the bottom angular parts of said sides and secured beneath said back-plate. While only one assembly of said straps is shown, it will be readily understood, without needless illustration, that there are several of such straps at intervals throughout the length of the rockable structure. Also, although these side portions 11 are inturned at their upper edges as shown at $b$ and confined within the inturned edges $a$ of the cover plate, while the outer edges of the prong carrying leaves are housed within these edges $b$, nevertheless the resilient action of the leaves is due to their confinement by the cover plate. However, this is not only a very common feature in ring binders, but it is not at all a matter that is germane to the present invention. But in this Figure 6 loose leaves 16 are shown on the ring A, the prongs comprising the ring being closed, and a majority of the leaves are shown on the downwardly tilted part of the ring, in order to emphasize the fact that leaves would be very apt to accidentally become detached from the ring when its prongs are opened either by pulling them apart or by the depression of a booster, unless the present invention made it impossible to open the prongs except when the binder structure was in a vertical position and to then lock the structure in this position.

In Figures 7 to 10 inclusive, I have shown a modification of the invention in which a booster is dispensed with and which will now be described.

An end plate 17 has cut therethrough lateral arcuate slots 18 that merge at the top into an upwardly extending recess 19, and reduced portions 20 at an end of the leaves 5 extend through one or the other of these slots when the binder structure is tilted to one side or the other, as shown at Figure 10, and the width of the slots is such that these portions 20 would strike the upper walls of the slots if an attempt were made to pull the prongs apart, and thus would prevent the opening of the prongs.

But if the binder structure were swung to a vertical position, as shown at Figure 8, then the prongs could be pulled apart and would be housed within the recess 19, as shown at Figure 9, and the structure would be thereby locked in this position until the prongs were closed.

It will certainly be clear that, in order to successfully operate the structure shown in my application, Serial No. 509,336, aforesaid, it is necessary to swing the structure to a vertical position before opening the prongs, especially when removing or changing the last sheets, and that, since the tendency of the structure is to tilt, great care must be taken to prevent this, since, if such tilting should suddenly occur, a lot of sheets would spill from the prongs, and thereby render it necessary to rearrange and replace them.

Defects of this sort are rendered impossible by my present invention, and the binder is more readily manipulated and the loose sheets more quickly and accurately handled.

What is claimed is:—

1. A loose leaf book having a sheet-holding structure rockably mounted thereon and means for preventing the opening of said structure in any position other than an upright one.

2. A loose leaf book having a sheet-holding structure rockably mounted thereon, means for preventing the opening of said structure except in an upright position, and means for holding said structure in an upright position until it has been again closed.

3. A loose leaf book of the ring type comprising a structure rockably mounted thereon, an opening lever for the rings and means for preventing the operation of said lever except when the sheet holding structure is in an upright position.

4. A construction as in claim 3 with the addition that the operation of the lever to open the rings automatically locks the latter in opened condition.

5. A loose leaf book of the ring type, comprising a structure rockably mounted on the back of the book, and means for simultaneously opening the rings and locking the structure with the rings open only when said structure is in an upright position.

In testimony whereof I affix my signature hereto.

JOHN SCHADE.